United States Patent [19]
Shigeoka et al.

[11] Patent Number: 5,305,251
[45] Date of Patent: Apr. 19, 1994

[54] MEMBERSHIP FUNCTION GENERATOR

[75] Inventors: Fumiaki Shigeoka; Masanari Oh, both of Fukuoka, Japan

[73] Assignee: Rohm Co., Ltd., Kyoto, Japan

[21] Appl. No.: 86,120

[22] Filed: Jul. 6, 1993

[30] Foreign Application Priority Data

Jul. 10, 1992 [JP] Japan .................. 4-184153

[51] Int. Cl.$^5$ .............................................. G06G 7/00
[52] U.S. Cl. .......................................... 364/807; 395/3
[58] Field of Search ............. 364/807; 395/3, 900; 307/201

[56] References Cited

U.S. PATENT DOCUMENTS

| | | | |
|---|---|---|---|
| 4,694,418 | 9/1987 | Ueno et al. | 364/807 |
| 4,837,725 | 6/1989 | Yamakawa | 364/807 |
| 5,113,366 | 5/1992 | Yamakawa | 364/807 X |
| 5,131,071 | 7/1992 | Tsutsumi et al. | 395/3 |
| 5,167,005 | 11/1992 | Yamakawa | 364/807 X |

Primary Examiner—Tan V. Mai
Attorney, Agent, or Firm—Oliff & Berridge

[57] ABSTRACT

A membership function generator comprising an adder circuit which receives input VIN and center position voltage Vx for generating one side of a membership function (MF), an inversion circuit which generates the other side of the MF, adder circuits which generate the upper base of a trapezoid MF, and an adder circuit which combines one side and the other side of MF and also sets the MF height.

7 Claims, 7 Drawing Sheets

MEMBERSHIP FUNCTION GENERATOR

BACKGROUND OF THE INVENTION

1. Field of the Invention

This invention relates to a membership function generator required when a fuzzy theory application is implemented by hardware.

2. Description of the Related Art

In recent years, a large number of applications of the fuzzy theory which can quantify indefinite or uncertain knowledge and information for handling have been implemented in such fields as home electric appliances and plant control. The fuzzy theory is put into practical use by software and hardware. Lately, fuzzy reasoning dedicated hardware appears to meet demands for high speed operation, etc. The dedicated hardware is of digital or analog type. The invention relates to the analog type of fuzzy hardware.

In fuzzy theory, indefinite or uncertain information is described by membership functions, thus means for generating the membership functions is required for the hardware. The analog hardware represents membership function values by, for example, analog voltages, and the specific membership function generator is made up of differential amplification circuits, etc.

FIG. 4 shows an example of a membership function generator made up of differential amplification circuits in the art. The membership function generator generates triangle and trapezoid membership functions and has a feature of generating left and right sides of membership functions separately.

In FIG. 4, D1 and D2 are differential amplification circuits for generating left and right sides of membership functions respectively. The left and right side positions of a membership function are given to inputs VL1 and VL2 respectively from an external system. Left and right side gradients can be adjusted separately according to the values of variable resistors RE1 and RE2. The height of a membership function is determined by the product of current value $I_O$ of constant current source Q1, Q2 and the value of load resistor RL. The left and right sides of the membership function generated at the differential amplification circuits D1 and D2 are combined by a minimum value calculation circuit Q3.

The circuitry shown in FIG. 4 enables triangle and trapezoid membership functions of various forms to be generated as shown in FIGS. 5 and 6 by setting values of the inputs VL1 and VL2, variable resistors RE1 and RE2, and current value $I_O$ (or load resistor RL).

On the other hand, however, the membership function generator requires a complicated membership function setting procedure. A number of parameters should be adjusted: The position and gradient of the left side and those of the right side of a membership function and the membership function height. In fact, most of the actually used membership functions are symmetrical triangle and trapezoid functions as shown in FIGS. 7 and 8. For symmetrical triangle membership functions, only three parameters are required: Center position, oblique side gradient, and height of the membership function. Even for symmetrical trapezoid membership functions, only the upper bottom length of the membership function is added to the three parameters. Thus, from the viewpoint of generating symmetrical membership functions, the conventional method of setting the right and left sides of each membership function separately is more complicated than necessary.

SUMMARY OF THE INVENTION

Accordingly, it is an object of the invention to provide a membership function generator of analog voltage type which can generate symmetrical triangle and trapezoid membership functions in a simple sequence.

It is another object of the invention to provide a membership function generator which can also generate asymmetrical triangle and trapezoid membership functions when necessary.

To these ends, according to the invention, there is provided a membership function generator where a membership value is represented by an analog voltage, the membership function generator comprising:

(a) a first side generation circuit which is responsive to the gradient and center position of a membership function given from an external system for generating one side of the membership function;

(b) a second side generation circuit which folds back the side of the membership function generated by the first side generation circuit symmetrically with the center position as the center for generating the other side of the membership function;

(c) first and second clip circuits which shift both sides of the membership function generated by the first and second side generation circuits in the height direction of the membership function in response to a value given from the external system and clip them at predetermined values;

(d) a combining circuit which combines both sides of the membership function generated by the first and second clip circuits into one form; and (e) a height adjustment circuit which is responsive to a value given from the external system for adjusting the height of the membership function whose sides are combined by the combining circuit.

The membership function generator can further include means for adjusting gradients of both sides of the membership function separately.

The membership function generator according to the invention is responsive to the oblique side gradient and center position of a membership function given from an external system for generating one side of the membership function. It is folded back with the center position as the center for generating the other side. Both sides generated are shifted and clipped in the height direction of the membership function in response to values given from the external system, thereby generating the upper bottom of trapezoid membership function. One side and the other side of the membership function are combined and further the membership function height is set for finally generating the symmetrical triangle or trapezoid membership function. As required, the left and right gradients of a membership function can also be adjusted separately.

DESCRIPTION OF THE PREFERRED EMBODIMENTS

Referring now to the accompanying drawings, there are shown preferred embodiments of the invention.

Figure 1:
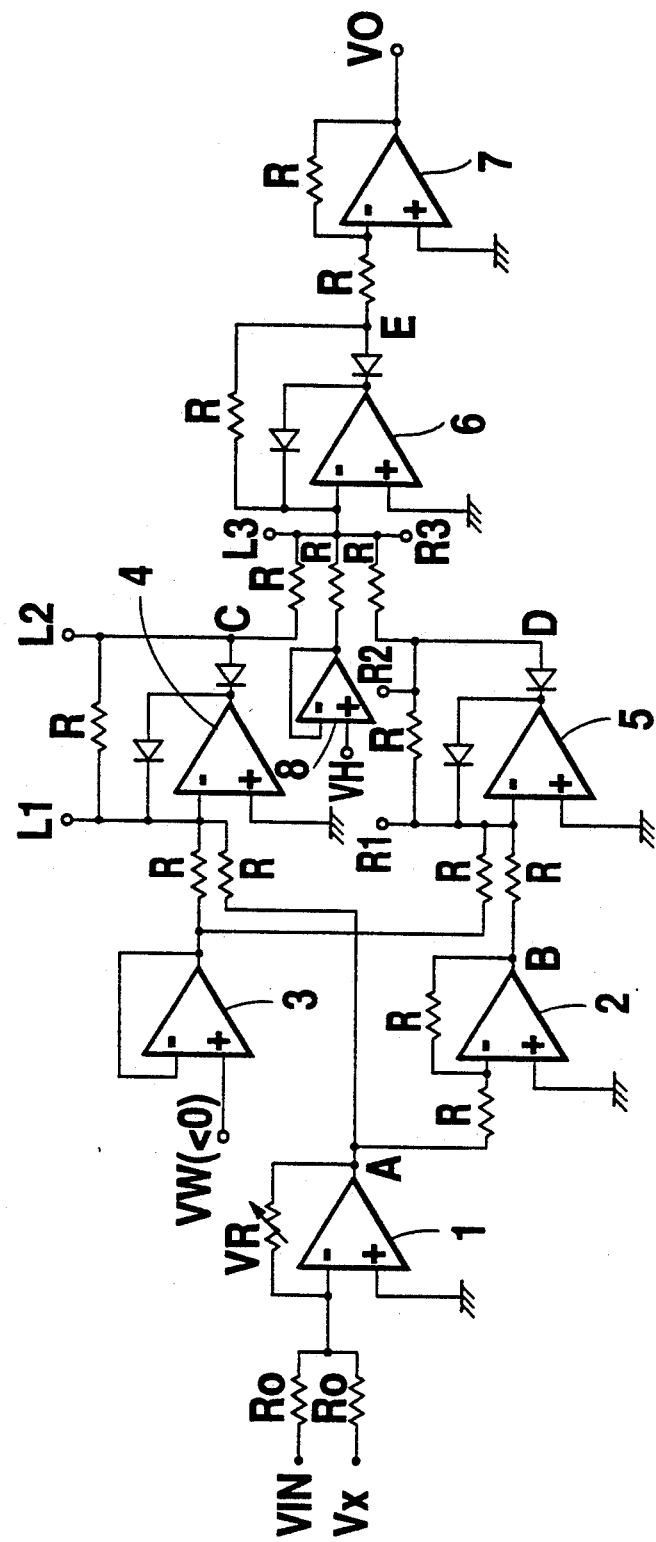
FIG. 1 is a circuit diagram of a membership function generator according to a first embodiment of the invention.

FIG. 1 shows a membership function generator according to a first embodiment of the invention, wherein numeral 1 is an adder circuit for generating one side of a membership function, numeral 2 is an inversion circuit for the other side of the membership function from an output of the adder circuit 1, numerals 4 and 5 are each an adder circuit with a clip circuit for generating the upper base of a trapezoid membership function, numeral 6 is an adder circuit with a clip circuit for combining both sides of the membership function which are mentioned above and also setting the height of the membership function to be generated, numerals 3 and 8 are input buffers, and numeral 7 is an output buffer.

In the circuitry shown in FIG. 1, input VIN is shifted in the horizontal axis (input-axis) direction by center position voltage Vx of a membership function, and its gradient is determined by the ratio of resistor $R_O$ to variable resistor VR. The input VIN is then output to point A in the inverted form. The output waveform is shown as A in FIG. 2a. It forms one side of the membership function. The waveform A shown in FIG. 2a, that is, the output at the point A in FIG. 1 is represented by the following expression:

$$A = -(VR/R_O) VIN - (VR/R_O) Vx \qquad \text{Expression 1}$$

The output of the adder circuit 1 is also fed into the inversion circuit 2. At output point B of the inversion circuit 2, the output at the point A is inverted with respect to the horizontal axis for output. The output waveform is shown as B in FIG. 2a. The waveform B takes a form of folding back the waveform A symmetrically in the horizontal axis direction with the center position voltage Vx of the membership function as the center. The waveform B forms the other side of the membership function. The waveform B shown in FIG. 2a, that is, the output at the point B in FIG. 1 is represented by the following expression:

$$B = -A$$
$$= (VR/R_O) VIN + (VR/R_O) Vx \qquad \text{Expression 2}$$

To change the oblique side gradient of the membership function, only the variable resistor VR needs to be adjusted. If the VR is varied, the gradient of the output at the point A changes and the gradient at the point B also changes symmetrically with the point A, thus the left and right gradients can be set at the same time by one adjustment means.

The outputs at points A and B are fed into the adder circuits 4 and 5 each with a clip circuit at the following stages. On the other hand, upper base setup value VW (VW<0 v) of a trapezoid membership function is input via the input buffer 3 to the adder circuits 4 and 5. Thus, the outputs at points A and B are shifted by VW in the vertical axis direction. The shifted output waveforms are shown as A1 and B1 in FIG. 2b. Further, A1 and B1 are inverted by the adder circuits 4 and 5. The inverted output waveforms are shown as A2 and B2 in FIG. 2b. Also, the outputs at points C and D are clipped at 0 v by ideal diodes. As a result, both sides of the trapezoid membership function are output to points C and D. The output waveforms are shown as C and D in FIG. 2b. To generate a triangle membership function, VW should be set to 0 v. The waveforms C and D shown in FIG. 2b, that is, the outputs at points C and D in FIG. 1 are represented by the following expressions:

$$C = (VR/R_O) VIN + (VR/R_O) Vx - VW \qquad \text{Expression 3}$$

$$D = -(VR/R_O) VIN - (VR/R_O) Vx - VW \qquad \text{Expression 4}$$

where C<0 v and D<0 v because of being clipped by ideal diodes.

Figure 2C:
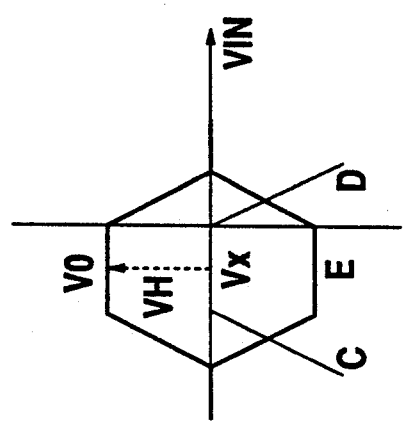
FIGS. 2c is waveform diagrams showing output waveforms at point C of the circuit shown in FIG. 1.
Figure 2B:
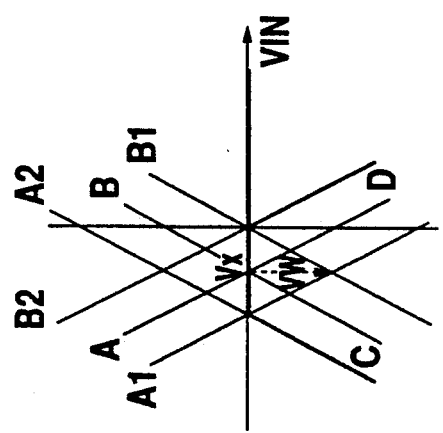
FIGS. 2b is waveform diagrams showing output waveforms at point B of the circuit shown in FIG. 1.
Figure 2A:
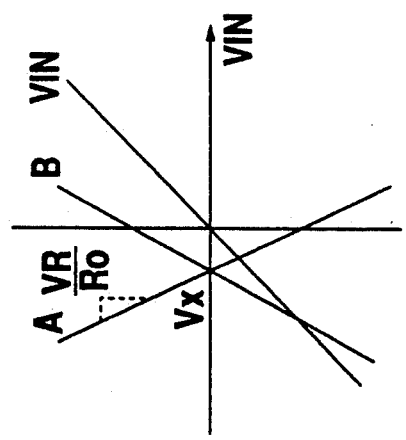
FIGS. 2a is waveform diagrams showing output waveforms at point A of the circuit shown in FIG. 1.

The outputs at points C and D are fed into the adder circuit 6 at the following stage. On the other hand, membership function height setup value VH is input via the input buffer 8 to the adder circuit 6. The outputs at points C and D are combined by the adder circuit 6, and the result is shifted b VH in the vertical axis direction, as shown in FIG. 2c. However, since the adder circuit 6 is an inversion circuit, the output waveform at point E becomes an inverted form of the membership function as shown as E in FIG. 2c. Since the output at point E of adder circuit 6 is clipped at 0 v by ideal diodes, the lower base section of the membership function is formed on the horizontal axis. The output at point E is inverted by the inversion circuit 7, an output buffer, and the final membership function is output as VO shown in FIG. 2c.

As a result, the left and right gradients of the membership function become $VR/R_O$, the length of the upper base $-2 VW R_O/VR$, and the center position $-Vx$.

According to the first embodiment, the position of the membership function on the horizontal axis is determined only by input value Vx and the left and right oblique side gradients can be adjusted at the same time only by adjusting the VR. Thus, symmetrical triangle and trapezoid membership functions can be generated in the minimum necessary setting sequence.

Figure 3:
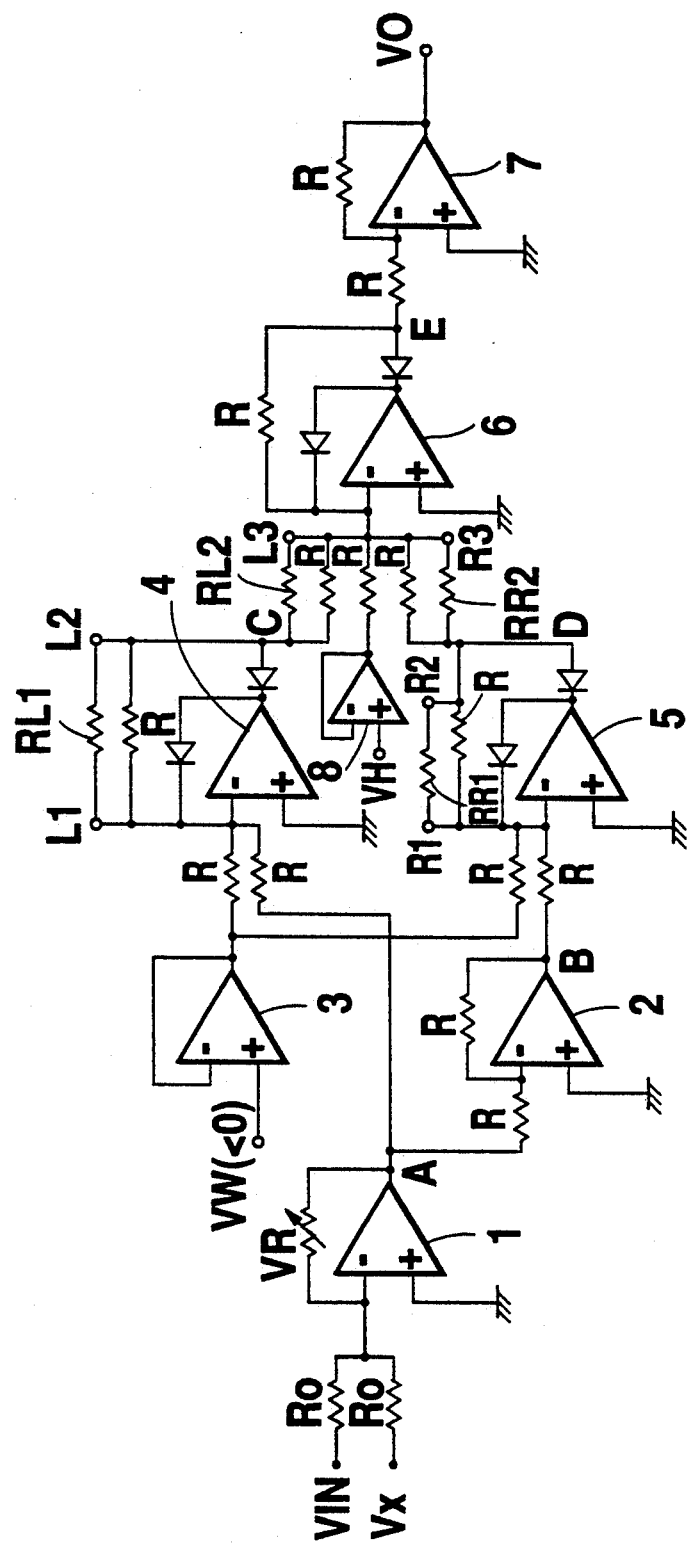
FIG. 3 is a circuit diagram of a membership function generator according to a second embodiment of the invention.
Figure 4:
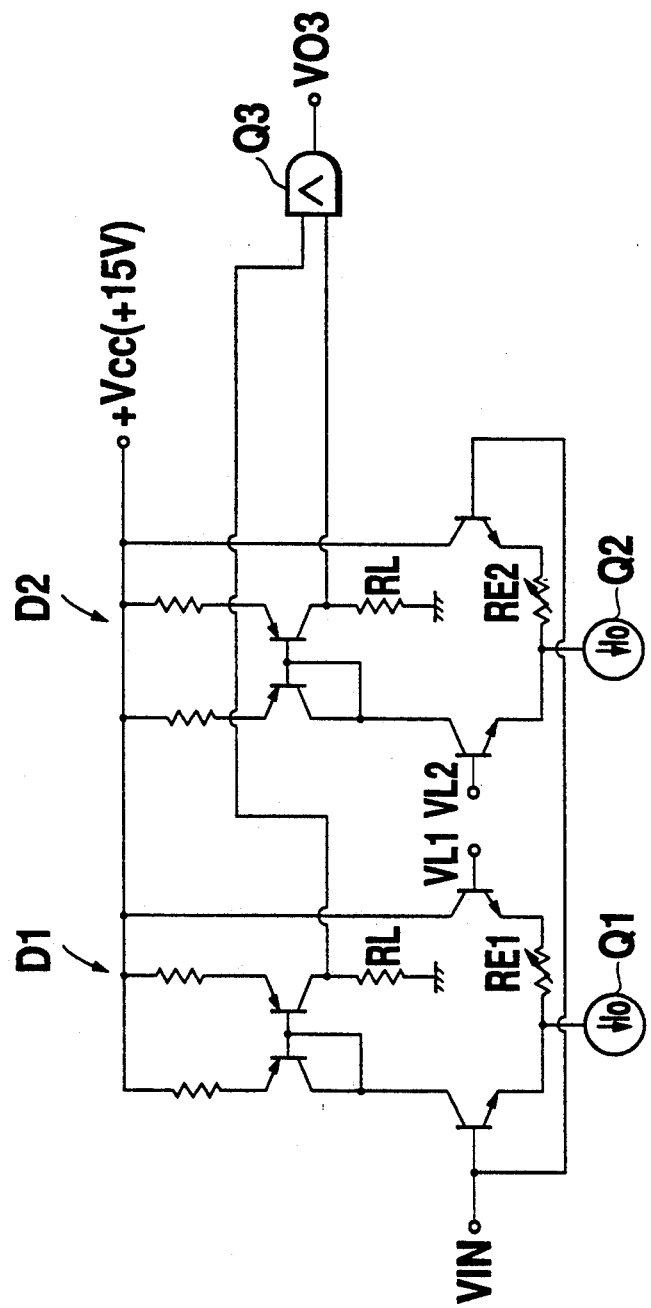
FIG. 4 is a circuit diagram showing an example of a membership function generator in the related art.
Figure 5:
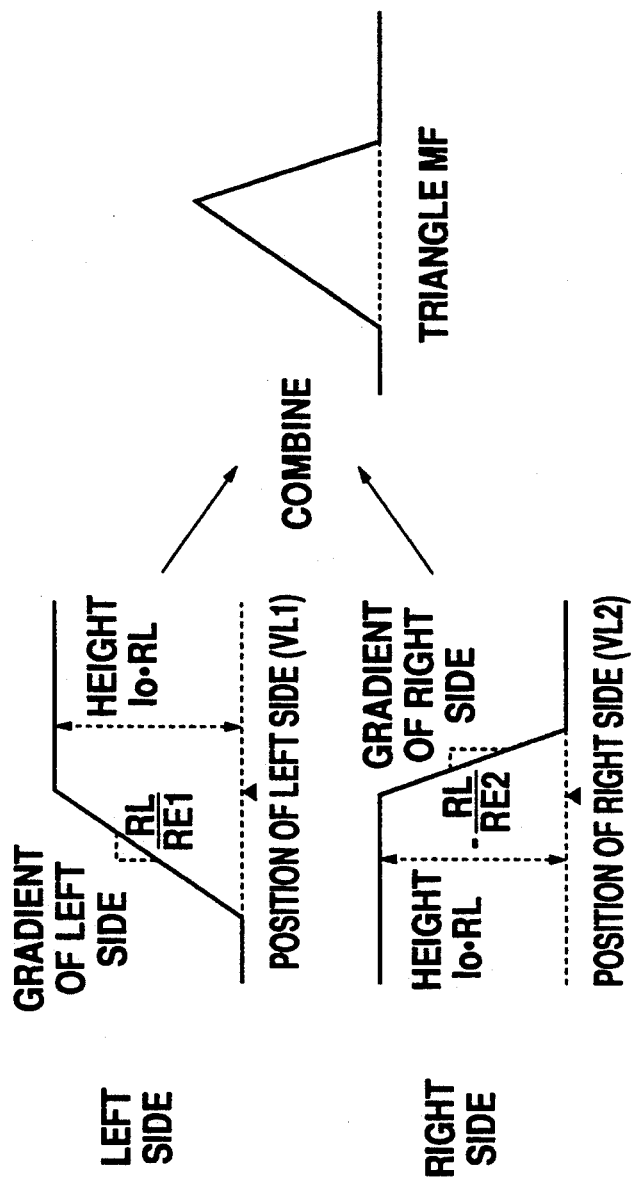
FIG. 5 is an illustration of a combining method of triangle membership functions according to a procedure in the related art.
Figure 6:
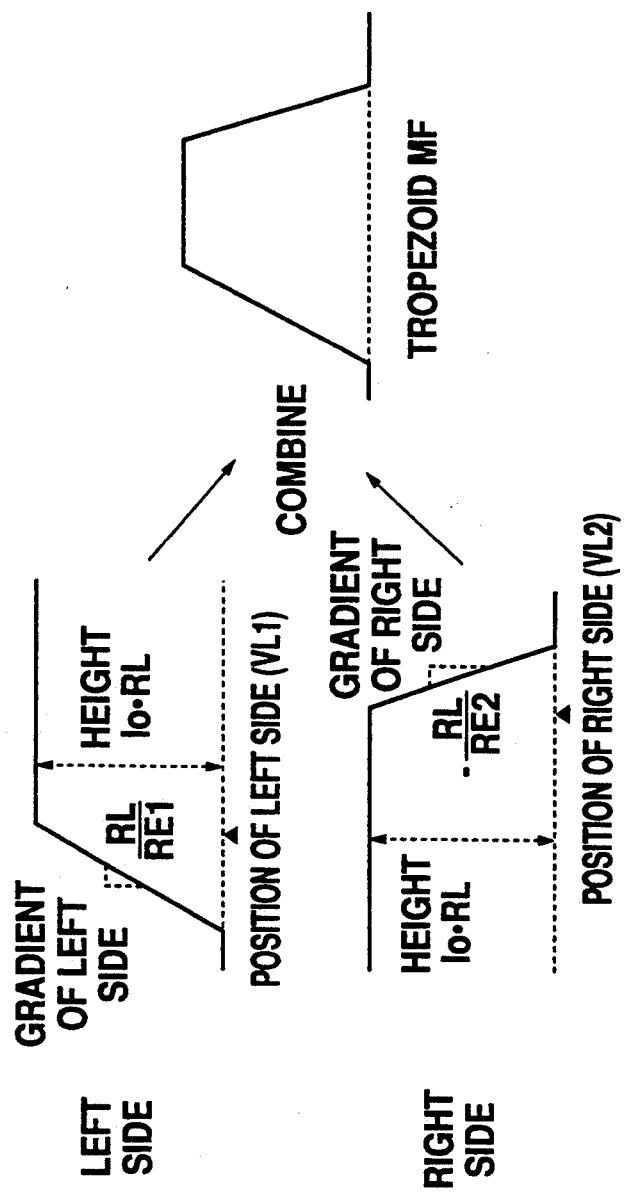
FIG. 6 is an illustration of a combining method of trapezoid membership functions according to a procedure in the related art.
Figure 7:
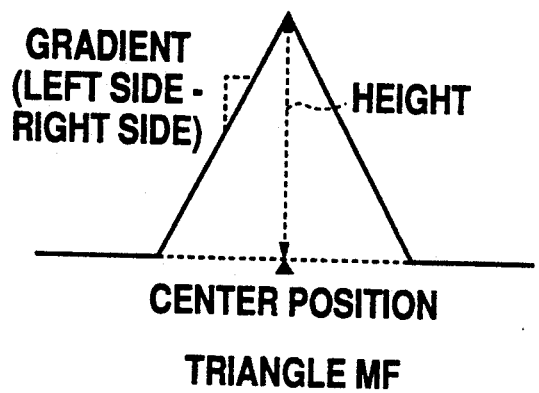
FIG. 7 is an illustration showing an example of a symmetrical triangle membership function.
Figure 8:
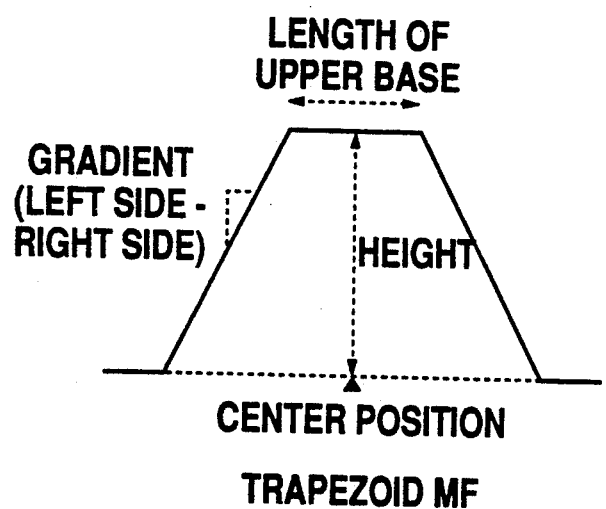
FIG. 8 is an illustration showing an example of a symmetrical trapezoid membership function.

On the other hand, a membership function whose left and right gradients are asymmetrical can also be generated by connecting resistors RL1 and RL2 and RR1 and RR2 to terminals of the adder circuits 4 to 6, L1, L2, and L3, and R1, R2, and R3, as shown in FIG. 3. In this case, gains of adder circuits 4 and 5 can be separately varied by the RL1 and RR1 values. Gains of the adder circuit 6 can also be separately varied by the RL2 and RR2 values for the left and right sides.

In the embodiment shown in FIG. 3, the left side gradient of membership function becomes $((RL1//R)/(RL2//R)) (VR/R_O)$ and the right side gradient becomes $((RR1//R)/(RR2//R)) (VR/R_O)$;

the left and right gradients of the membership function can be adjusted separately.

Thus, according to the invention, symmetrical triangle and trapezoid membership functions can be set in a simple sequence and as required, and asymmetrical triangle and trapezoid membership functions can also be set.

As described above, according to the invention, the following effects are provided:

(1) A symmetrical triangle membership function can be generated only by setting the minimum necessary parameters, namely, the center position, oblique side gradient, and height of the membership function;

(2) a symmetrical trapezoid membership function can be generated by setting the minimum necessary parameters, namely, the length of the upper base in addition to the parameters in (1);

(3) since minimum necessary parameters need to be set, the sequence required to generate a membership function can be simplified; and (4) to generate an asymmetrical membership function, the left and right gradients of the membership function can also be adjusted separately.

What is claimed is:

1. A membership function generator where a membership value is represented by an analog voltage, said membership function generator comprising:

a first side generation circuit which is responsive to a gradient and center position of a membership function given from an external system for generating one side of the membership function;

a second side generation circuit which folds back the side of the membership function generated by said first side generation circuit symmetrically with a center position as a center for generating another side of the membership function;

first and second clip circuits which shift both sides of the membership function generated by said first and second side generation circuits in a height direction of the membership function in response to a value given from the external system and clip them at predetermined values;

a combining circuit which combines both sides of the membership function generated by said first and second clip circuits into one form; and a height adjustment circuit which is responsive to a value given from the external system for adjusting the height of the membership function whose sides are combined by said combining circuit.

2. The membership function generator as claimed in claim 1 further including means for adjusting gradients of both sides of the membership function separately.

3. The membership function generator as claimed in claim 2 wherein said means for adjusting gradients of both sides of the membership function separately is resistor means.

4. The membership function generator as claimed in claim 1 wherein said first side generation circuit is an adder circuit.

5. The membership function generator as claimed in claim 1 wherein said second side generation circuit is an inversion circuit.

6. The membership function generator as claimed in claim 1 wherein said first and second clip circuits and said combining circuit are adder circuits each provided with a clip circuit.

7. The membership function generator as claimed in claim 1 wherein said height adjustment circuit is an input buffer.

* * * * *